(12) United States Patent
Makris

(10) Patent No.: US 10,108,711 B2
(45) Date of Patent: Oct. 23, 2018

(54) ODATA ENABLEMENT FOR PERSONAL OBJECT WORKLISTS

(71) Applicant: Otto Makris, Heidelberg (DE)

(72) Inventor: Otto Makris, Heidelberg (DE)

(73) Assignee: SAP SE, Walldorf (DE)

( * ) Notice: Subject to any disclaimer, the term of this patent is extended or adjusted under 35 U.S.C. 154(b) by 139 days.

(21) Appl. No.: 14/333,136

(22) Filed: Jul. 16, 2014

(65) Prior Publication Data

US 2016/0019295 A1   Jan. 21, 2016

(51) Int. Cl.
*G06F 7/00*   (2006.01)
*G06F 17/30*  (2006.01)

(52) U.S. Cl.
CPC .. *G06F 17/30864* (2013.01); *G06F 17/30604* (2013.01)

(58) Field of Classification Search
USPC .......................................................... 707/763
See application file for complete search history.

(56) References Cited

U.S. PATENT DOCUMENTS

| | | | |
|---|---|---|---|
| 8,489,735 B2 * | 7/2013 | Befort | G06F 11/0709 709/224 |
| 8,606,723 B2 | 12/2013 | Seubert et al. | |
| 8,655,756 B2 | 2/2014 | Seubert et al. | |
| 8,694,397 B2 | 4/2014 | Seubert et al. | |
| 8,744,937 B2 | 6/2014 | Seubert et al. | |
| 2007/0192291 A1 * | 8/2007 | Vins | G06F 17/30657 |
| 2010/0088110 A1 * | 4/2010 | Lemke | G06F 17/30516 705/2 |
| 2013/0290880 A1 * | 10/2013 | Wu | G06F 17/30569 715/764 |
| 2013/0304799 A1 * | 11/2013 | Lutter | G06F 17/30477 709/203 |
| 2014/0149391 A1 * | 5/2014 | Walter | H04W 52/027 707/722 |

OTHER PUBLICATIONS

SAP, Step-by-step guide to build an OData Service based on RFCs—Part 1, pp. 1-25, 2012.*
SAP, Step-by-step guide to build an OData Service based on RFCs—Part 2, pp. 1-26, 2012.*
David Chappell, Introducing OData Data Access for the Web, The Cloud, Mobile Devices, and More, pp. 1-24, 2011.*

* cited by examiner

*Primary Examiner* — Cheyne D Ly
(74) *Attorney, Agent, or Firm* — Fish & Richardson P.C.

(57) ABSTRACT

The present disclosure describes methods, systems, and computer program products for exposing a personal object worklist (POWL) as an OData service. One computer-implemented method includes registering the personal object worklist (POWL) application, wherein the registration includes specifying a POWL application ID ("APPLID") and mapping the APPLID to an OData-based service technical model, selecting one or more POWL queries associated with the POWL application for consumption when received by an OData service associated with the OData-based service technical model, specifying a query key for each POWL query of the one or more POWL queries, registering the OData service in a backend system, and activating the OData service on a gateway server system.

20 Claims, 9 Drawing Sheets

700

| Service Information | |
|---|---|
| Technical Service Name | /U12/SAMPLE_EPM_POWL_CUST |
| Service Version | 1 |
| Description | Sample POWL for APPLID EPM_POWL (customizing) |
| External Service Name | SAMPLE_EPM_POWL_CUST |
| Namespace | /U12/ |
| Data Provider Class | /U12/CL_POWL_APPLID_DATA |
| Created By | MAKR15 |
| Created By | MAKR15 |
| Model Information | |
| Technical Model Name | /U12/SAMPLE_APPLID_EPM_POWL_CU |
| Model Version | 1 |
| Description | Sample model provider class for POWL APPLID EPM_PO (cust.) |
| Model Provider Class | /U12/CL_POWL_MODEL_CUST |
| Created By | MAKRIS |
| Changed By | |

702 — Technical Service Name
704 — Data Provider Class
706 — Technical Model Name
708 — Model Provider Class

FIG. 7

| Registration of cache support for service | | | | | | |
|---|---|---|---|---|---|---|
| Service name | Cache support class | Data provider class | Filtering | Sorting | Paging | Cache Active |
| /U12/SAMPLE_EPM_POW_ | | /U12/CL_POWL_APPLID_ | ☐ | ☐ | ☐ | ☑ |
| ZOTTO_RMTSAMPLEFLIG_ | | /IWBEP/CL_MGW_TR_SF_ | ☐ | ☐ | ☐ | ☑ |

FIG. 9

ODATA ENABLEMENT FOR PERSONAL OBJECT WORKLISTS

BACKGROUND

A Personal Object Work List ("POWL") is a framework that can list business objects and allows specific activities (actions) based on the business objects. It provides an enterprise portal user a general overview of their work environment and related business objects desired to be worked on. A POWL allows worklists to be defined and stored as queries that can be activated so that their results are visible when a portal page or work set is navigated to containing a POWL view. POWLs, however, are web-based but not OData based. As a result, POWLs associated with applications must use custom code/interfaces to interface with backend systems resulting in, among other things, higher total cost-of-ownership, maintenance issues, and lack of standardization among applications.

SUMMARY

The present disclosure relates to computer-implemented methods, computer-readable media, and computer systems for exposing a personal object worklist (POWL) as an OData service. One computer-implemented method includes registering the personal object worklist (POWL) application, wherein the registration includes specifying a POWL application ID ("APPLID") and mapping the APPLID to an OData-based service technical model, selecting one or more POWL queries associated with the POWL application for consumption when received by an OData service associated with the OData-based service technical model, specifying a query key for each POWL query of the one or more POWL queries, registering the OData service in a backend system, and activating the OData service on a gateway server system.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein exposure of a specific POWL query though an OData service can be disabled.

A second aspect, combinable with any of the previous aspects, wherein the query key is required for each active POWL query.

A third aspect, combinable with any of the previous aspects, wherein registering the OData service in the backend system includes supplying information including service name, version, description, and external service name.

A fourth aspect, combinable with any of the previous aspects, wherein registration of the OData service comprises: specification of a data provider class performing translation between a POWL application and data used by a generic gateway, specification of a custom technical model name, and specification of a model provider class that describes an Entity Data Model (EDM) of the OData service and allows POWL applications to define custom OData models.

A fifth aspect, combinable with any of the previous aspects, comprising exposing the POWL application as an OData service following registration and activation of the OData service.

A sixth aspect, combinable with any of the previous aspects, comprising testing the exposed OData service using testing uniform resource locators (URLs).

The subject matter described in this specification can be implemented in particular implementations so as to realize one or more of the following advantages. First, applications can expose a personal object worklist ("POWL") as an OData service without any knowledge of OData programming in a gateway server OData channel. The exposure of the POWL as an OData service is performed generically by an OData enablement service. Second, the exposure of any POWL query as an OData service adds value to a system by, among other things, allows simplified use and/or an expanded user base. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 7 illustrates a GUI permitting registration of the OData service in the backend according to an implementation.

FIG. 9 illustrates a screenshot of an example GUI providing customization to register the POWL-OData service for support for system query options (and/or other services) according to an implementation.

Like reference numbers and designations in the various drawings indicate like elements.

DETAILED DESCRIPTION

Figure 1:
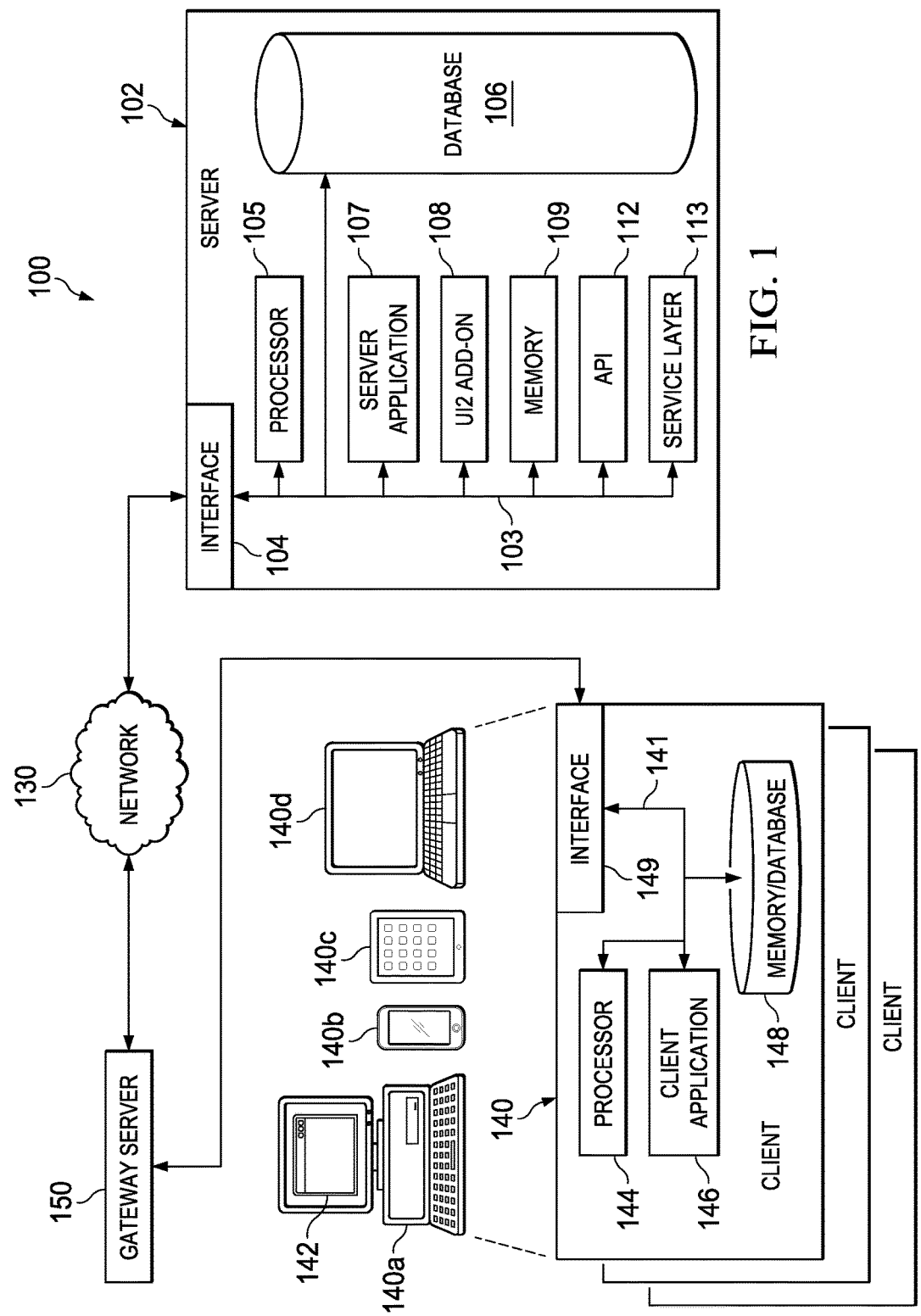
FIG. 1 is a block diagram illustrating an example distributed computing system (EDCS) for exposing a personal object worklist (POWL) as an OData service according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Open Data Protocol (OData) is a web protocol for querying and updating data over networks and allows for a user to request data from a data source over the Hypertext Transfer Protocol and receive results back from the data source in formats such as Atom Publishing Protocol (Atom), JAVASCRIPT Object Notation (JSON), and Extensible Markup Language (XML), etc. The OData protocol is increasingly used by mobile computing and other computing platforms, such as smartphones and tablet computers, as an important method of access to information over networks.

This disclosure generally describes computer-implemented methods, computer-program products, and systems for exposing a personal object worklist (POWL) as an OData service. The OData enablement service functionality is part of a user interface (UI) add-on allowing an application to expose a POWL as an OData service without any coding. In some implementations, a POWL OData service corresponds to exactly one POWL application ID (e.g., APPLID). The application is merely required to register the POWL as an OData service in a customizing activity (e.g., using a GUI application).

Clients (e.g., devices and/or software) may access cloud-based or other hosted applications, for example business applications/services, through a gateway server. The gateway server provides a service with a defined API/interface and acts as a gateway-type hub between a client and applications allowing easier provisioning and consumption of business logic and content of application/service backend systems as well as other data sources. In other words, the gateway server provides user-centric application access/support for client applications running on various devices and UI-technologies (e.g. smartphones, tablet computers, HTML5 clients, etc.) to access customer applications/services.

In some implementations, the gateway server can communicate with applications/services using, for example, OData requests to one or more backend servers generated from hypertext transfer protocol (HTTP) or hypertext transfer protocol secure (HTTPS) requests received from the clients. The gateway server can convert internal requests/responses in any format (e.g., in an OData format) back into HTTP/HTTPs to return data to the clients. In some implementations, the gateway server can use a remote function call (RFC) interface to communicate with applications/services. As will be appreciated by those skilled in the art, the use of OData, HTTP(S), RFC, XML/JSON, and the like can be substituted for other protocols, computer languages, etc. The exemplary use of a protocol, computer language, etc. in this disclosure is not meant to be limiting in any way. Other appropriately formatted requests in any protocol and/or computer language are also considered to be within this scope of this disclosure.

In some implementations, a gateway server and/or associated components can be stand-alone and/or incorporated into any component of a distributed computing system. In some implementations the gateway server and/or associated components may be one or more hardware servers, software servers, and/or virtual servers. In some implementations, the gateway server and/or associated components can be part of a web server, a streaming server, an RSS server, or other suitable server.

FIG. 1 is a block diagram illustrating an example distributed computing system (EDCS) 100 for exposing a personal object worklist (POWL) as an OData service according to an implementation. The illustrated EDCS 100 includes or is communicably coupled with a server 102, one or more clients 140, and a gateway server 150 (as described above) that communicate across a distributed computing network 130. In some implementations, one or more components of the EDCS 100 may be configured to operate as part of a cloud-based computing environment.

At a high level, the server 102 is an electronic computing device operable to receive, transmit, process, store, or manage data and information associated with the EDCS 100. In general, the server 102 provides functionality appropriate to a server, including database functionality and receiving/serving content and/or functionality from/to a client 140. According to some implementations, the server 102 may also include or be communicably coupled with an e-mail server, a web server, a caching server, a streaming data server, a business intelligence (BI) server, and/or other server.

The server 102 is responsible for receiving, among other things, requests and/or content from one or more client applications 146 associated with the client 140 of the EDCS 100 through the gateway server 150. The server 102 can also respond to received requests, for example requests processed by a server application 107, UI2 add-On 108, database 106, and/or other component of server 102.

In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the server application 107, the UI2 Add-On 108, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required for exposing a personal object worklist (POWL) as an OData service.

The server 102 also includes a database 106 that holds data for the server 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. Database 106 can be configured to store one or more instances of any appropriate data (e.g., user profiles, objects and content, client data, etc.—whether or not illustrated) consistent with this disclosure.

The server application 107 is an algorithmic software engine capable of providing, among other things, any appropriate function consistent with this disclosure for the server 102 (e.g., receiving, processing, transmitting, and/or other functionality with respect to a message sent by a client 140). In some implementations, the server application 107 can be used for functions particular to the server 102. In some implementations, the server application 107 can provide and/or modify content provided by and/or made available to other components of the EDCS 100. In other words, the server application 107 can act in conjunction with one or more other components of the server 102 and/or EDCS 100 in responding to a message (e.g., a request) for content received from the client 140.

Although illustrated as a single server application 107, the server application 107 may be implemented as multiple server applications 107. In addition, although illustrated as integral to the server 102, in alternative implementations, the server application 107 can be external to the server 102 and/or the EDCS 100 (e.g., wholly or partially executing on the client 140, other server 102 (not illustrated), etc.). Once a particular server application 107 is launched, the particular server application 107 can be used, for example by an application or other component of the EDCS 100 to interactively process received messages (e.g., from client 140). In some implementations, the server application 107 may be a network-based, web-based, and/or other suitable application consistent with this disclosure.

In some implementations, a particular server application 107 may operate in response to and in connection with at least one message received from other server applications 107, other components (e.g., software and/or hardware modules) associated with another server 102, and/or other components of the EDCS 100. In some implementations, the server application 107 can be accessed and executed in a cloud-based computing environment using the network 130. In some implementations, a portion of a particular server application 107 may be a web service associated with the server application 107 that is remotely called, while another portion of the server application 107 may be an interface object or agent bundled for processing by any suitable component of the EDCS 100. Moreover, any or all of a particular server application 107 may be a child or sub-module of another software module or application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The UI2 Add-On is exposes existing functionality as an OData service. For example, a POWL-OData service, a page builder service, a navigation service, a startup service, and/or an interoperability service. The UI2 add-on (FIG. 2, 108) contains a UI2 POWL framework and a UI2 POWL customizing user interface.

The memory 109 typically stores objects and/or data associated with the purposes of the server 102 but may also be used in conjunction with the database 106 to store, transfer, manipulate, etc. objects and/or data. The memory 109 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the server 102. In general, the client 140 comprises an electronic computing device operable to receive, transmit, process, and store any appropriate data associated with the EDCS 100, for example, the server application 107. More particularly, among other things, the client 140 can collect content from the client 140 and upload the collected content to the server 102 for processing by the server application 107. The client typically includes a processor 144, a client application 146, a memory/database 148, and/or an interface 149 interfacing over a system bus 141.

In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a particular message (e.g., a database request or a request for content) to the server 102.

The client application 146 is any type of application that allows the client 140 to navigate to/from, request, view, create, edit, delete, administer, and/or manipulate content associated with the server 102 and/or the client 140. For example, the client application 146 can present GUI displays and associated data to a user that is generated/transmitted by the server 102 (e.g., the server application 107 and/or database 106).

In some implementations, the client application 146 can also be used to perform administrative functions related to the server application 107, database 106, and/or the server 102 in general. For example, the server application 107 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140.

The memory/database 148 typically stores objects and/or data associated with the purposes of the client 140 but may also be consistent with the above-described database 106 and/or memory 109 of the server 102 or other memories within the EDCS 100 and be used to store data similar to that stored in the other memories of the EDCS 100 for purposes such as backup, caching, and the like. Although illustrated as a combined memory/database, in some implementations, the memory and database can be separated (e.g., as in the server 102).

Further, the illustrated client 140 includes a GUI 142 that interfaces with at least a portion of the EDCS 100 for any suitable purpose. For example, the GUI 142 (illustrated as associated with client 140*a*) may be used to view and/or transmit data associated with the client 140, the server 102, or any other component of the EDCS 100. In particular, in some implementations, the client application 146 may render GUI interfaces, data, and/or other content received from any element of the EDCS 100.

There may be any number of clients 140 associated with, or external to, the EDCS 100. For example, while the illustrated EDCS 100 includes three clients 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example implementations illustrated as 140*a*-140*d*) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140*a*).

Figure 2:
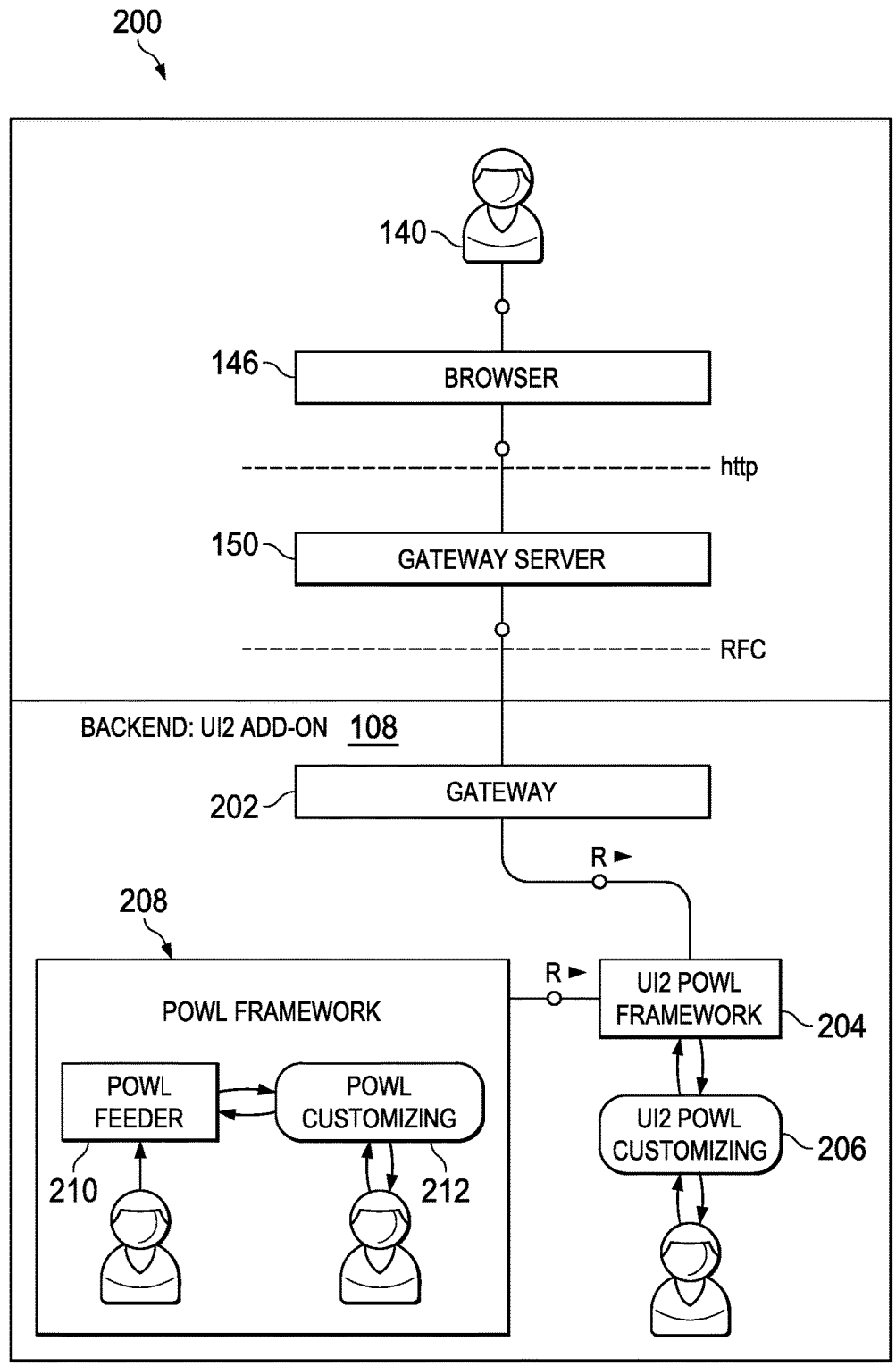
FIG. 2 illustrates a lower-level view of the UI2 add-on of FIG. 1 according to an implementation.

FIG. 2 illustrates a lower-level view 200 of the UI2 add-on of FIG. 1 according to an implementation. As illustrated, a user (e.g., client 140) using, for example, a browser (e.g., client application 146) sends an HTTP request to the gateway server 150. The gateway server analyzes the received HTTP request, determines the request contains POWL-related OData service in a URL, and forwards the request using remote function call (RFC) to the local gateway 202 residing on the backend (e.g., server 102). The local gateway 202 (also "gateway channel") is deployed with the UI2 Add-On 108 as a prerequisite to the UI2 Add-On 108 and provides means for building OData Services. In some implementations, the gateway server 150 can be deployed as a hub connecting several local gateways 202 with each other. Its purpose is to register and manage OData services from each local gateway 202. In addition it provides tools for performance analysis, tracing, logging etc. The local gateway 202 calls the UI2 POWL framework 204 which reads UI2 POWL customizing for the user to determine a POWL application ID (e.g., APPLID) and associated queries. This information is used to for the following: 1) constructs the OData model by reading a POWL model using the POWL framework 208 to transform the POWL model into a corresponding OData model. The POWL model describes the fields of a POWL structure and certain attributes, e.g., type, length, obligatory field, etc. and 2) retrieving data by reading the POWL framework 208. Here the content of a POWL query (the data) is read from the database and is converted to a corresponding OData entity set. If caching is involved, data is read from a cache (e.g., the UI2 cache) which, in some implementations, is a server-based cache whose purpose is to enhance the performance of any application exposing OData services. It stores the result of an OData query (e.g., a GET request) and returns it when the same query is fired. Invalidation algorithms ensure that the cache is invalidated when certain events occur in the system. The POWL Framework 208 enables any application to expose its content as a Personal Object Worklist (POWL) and provides applications a feeder interface (POWL feeder 210) which can be implemented to expose their objects as a POWL. Additionally it provides a POWL Customizing 212 (UI) in which queries can be defined.

Figure 3:
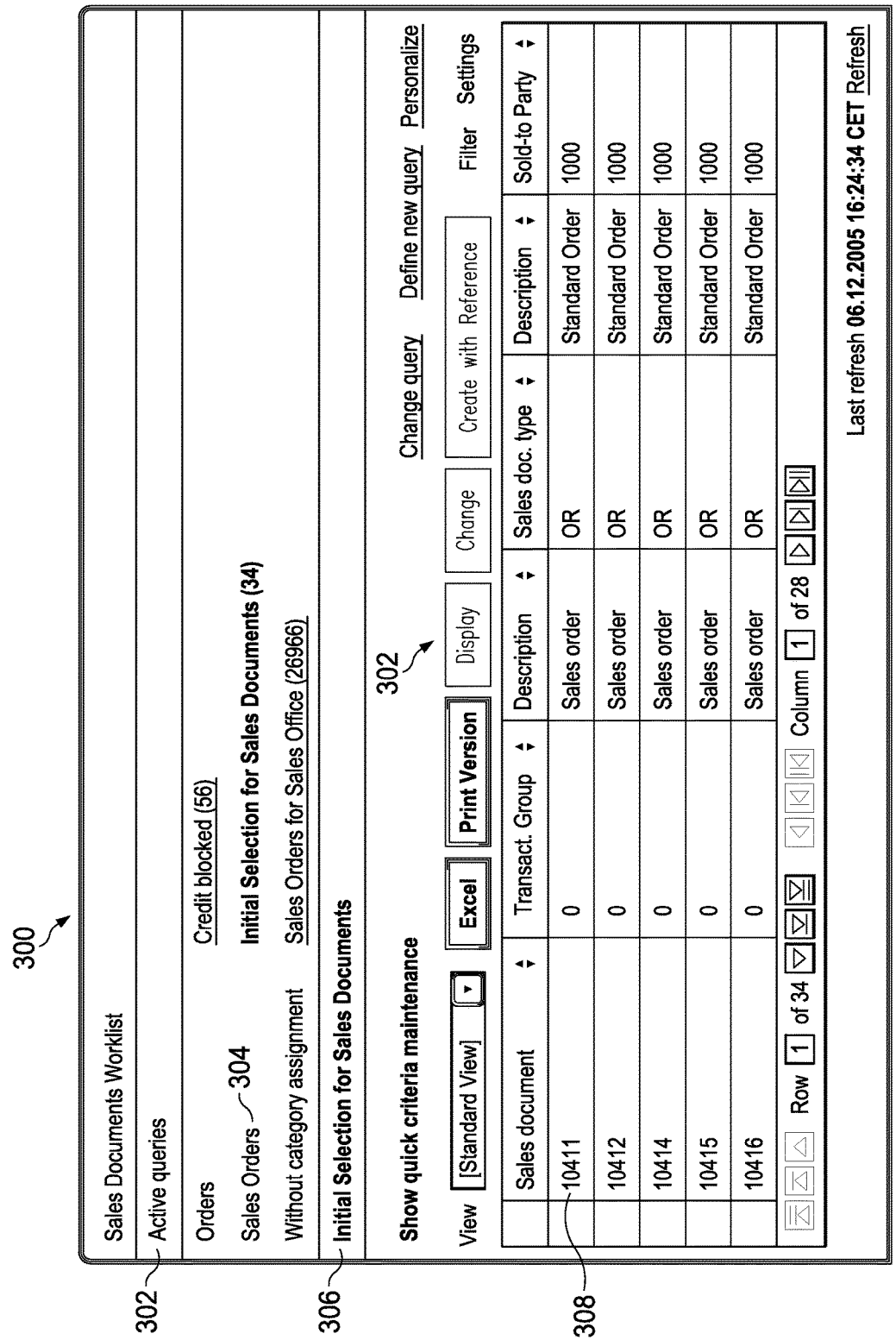
FIG. 3 illustrates a user interface for using a POWL according to an implementation

FIG. 3 illustrates a user interface 300 for using a POWL (e.g., a "Sales Document Worklist") according to an implementation. A user can assign themselves to worklists (e.g., a sales document worklist) and if select a worklist a user interface similar to that shown in FIG. 3 can be displayed to allow the use of the worklist. For example, for the sales document worklist, active queries 302 are displayed. The active queries allow the user to quickly select a query to be executed to return data. In this example, the user has selected active query 304 "Sales Orders Initial Selection for Sales Documents (34)" and been provided query results 306. For example, sales document 10411 (308) is a result of the active query 304.

The user also has available actions that can be performed on selected query results. For example, if a user selects result 308, appropriate actions 310 (e.g., display, change, create with reference, etc.) can be activated for use to operate on the selected result 308.

This example GUI functionality is available on a browser (e.g., client application 146) but worked only on particular system (custom programming). The improvement is to expose a service that is OData enabled providing similar functionality (i.e., enabling any type of POWL query available on the system with an OData service). This requires user customizing of the POWL query as an OData service but no programming. A source POWL query is taken as a model and exposed as an OData service by mapping it to an OData service. The POWL functionality is then also available as an OData service.

Figure 4:
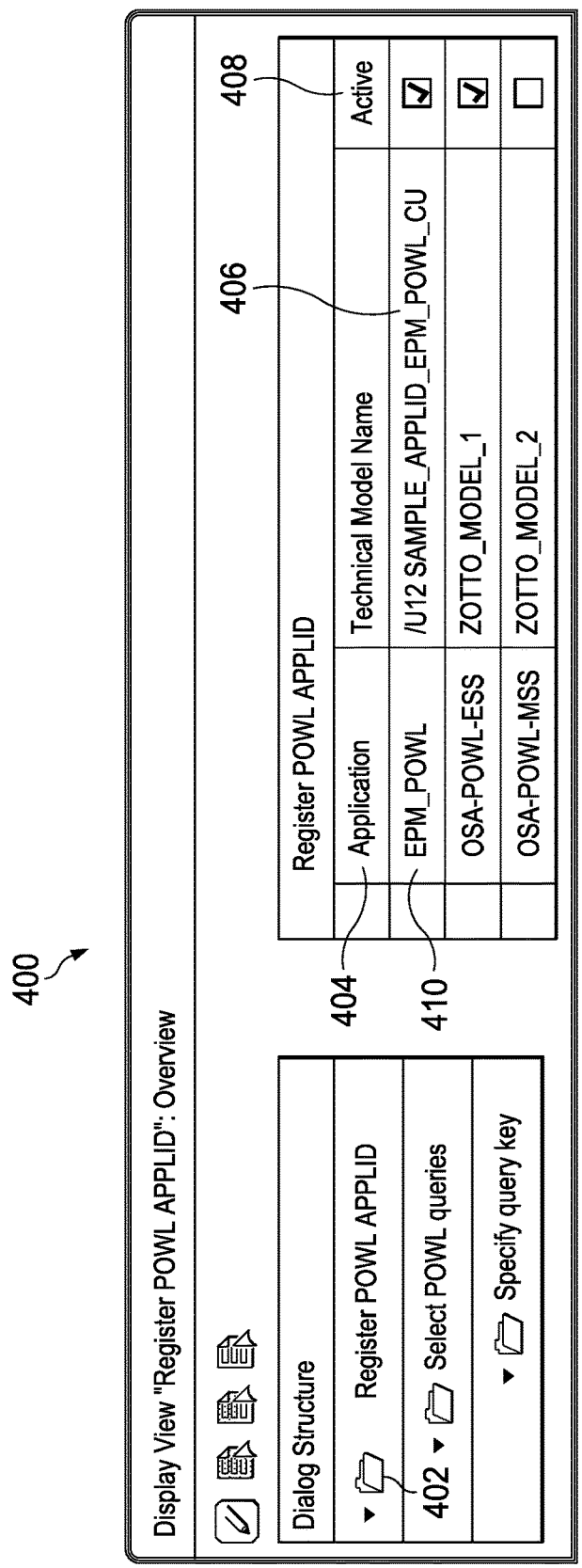
FIG. 4 illustrates a GUI for registering a POWL application ID according to an implementation.

FIG. 4 illustrates a GUI 400 for registering a POWL application ID ("APPLID") according to an implementation. As an example, POWL service "/UI2/SAMPLE_EPM_POWL_CUST" is created (see FIG. 7 for additional detail). The POWL APPLID is specified and mapped to the technical model name upon which an OData service is based. Note that the OData model name does not have to exist at this stage. UI2 POWL customizing is called to generate the GUI 400 to register a POWL application ID. As illustrated in FIG. 4, a user has selected "Register POWL APPID" 402 in the navigation pane of the GUI 400. The available POWL applications 404 are displayed along with technical model names 406 for each application. Two POWL applications are marked at 408 as active (e.g., similar to active queries 302 in FIG. 3). If a user selects (e.g., double-clicks or selects and selects "Select POWL queries" in the left navigation pane") "EPM-POWL" 410, a new dialog appears permitting selection of particular POWL queries (see FIG. 5).

Figure 5:
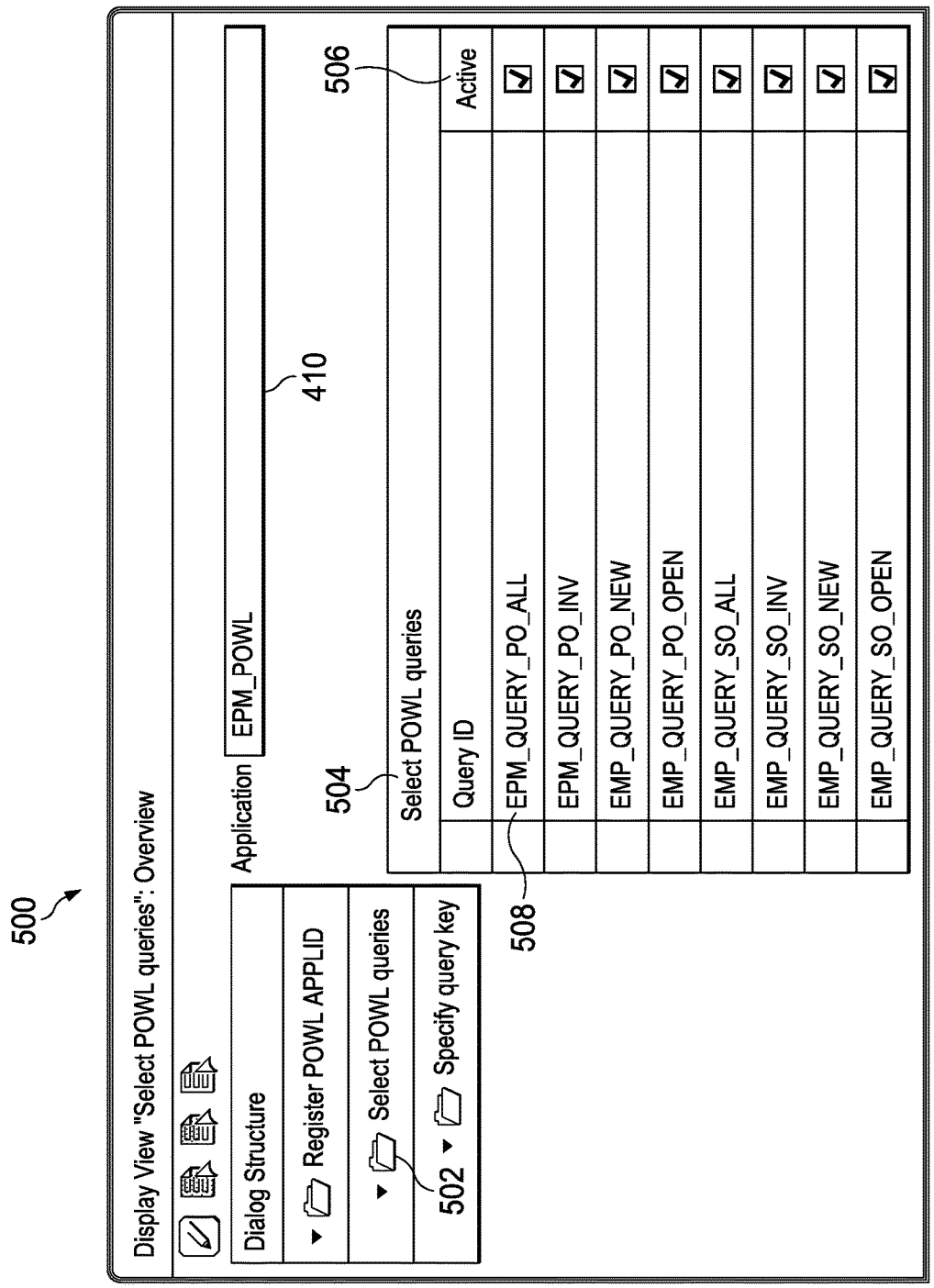
FIG. 5 illustrates a GUI for selecting POWL queries associate with a POWL application to be consumed according to an implementation.

FIG. 5 illustrates a GUI 500 for selecting POWL queries associate with a POWL application to be consumed according to an implementation. The POWL queries to consume are selected (e.g., as indicated at 502). Note that the POWL queries are associated with POWL application "EPM_POWL" 410 as selected in FIG. 4. Each POWL query 504 can be individually selected (e.g., by a checkbox to the left of the Query ID value or by another method such as double-clicking) as well as marked as active or inactive (at 506) for the POWL application 410. For example, an administrator may wish to disable specific queries to be exposed through an OData service.

Note that typical implementations do not take into account actions (e.g., 302 of FIG. 3) and only accounts for queries in exposing POWL applications as an OData service. In other implementations, the GUIs and underlying data structures can be modified to account for associated actions as well.

Figure 6:
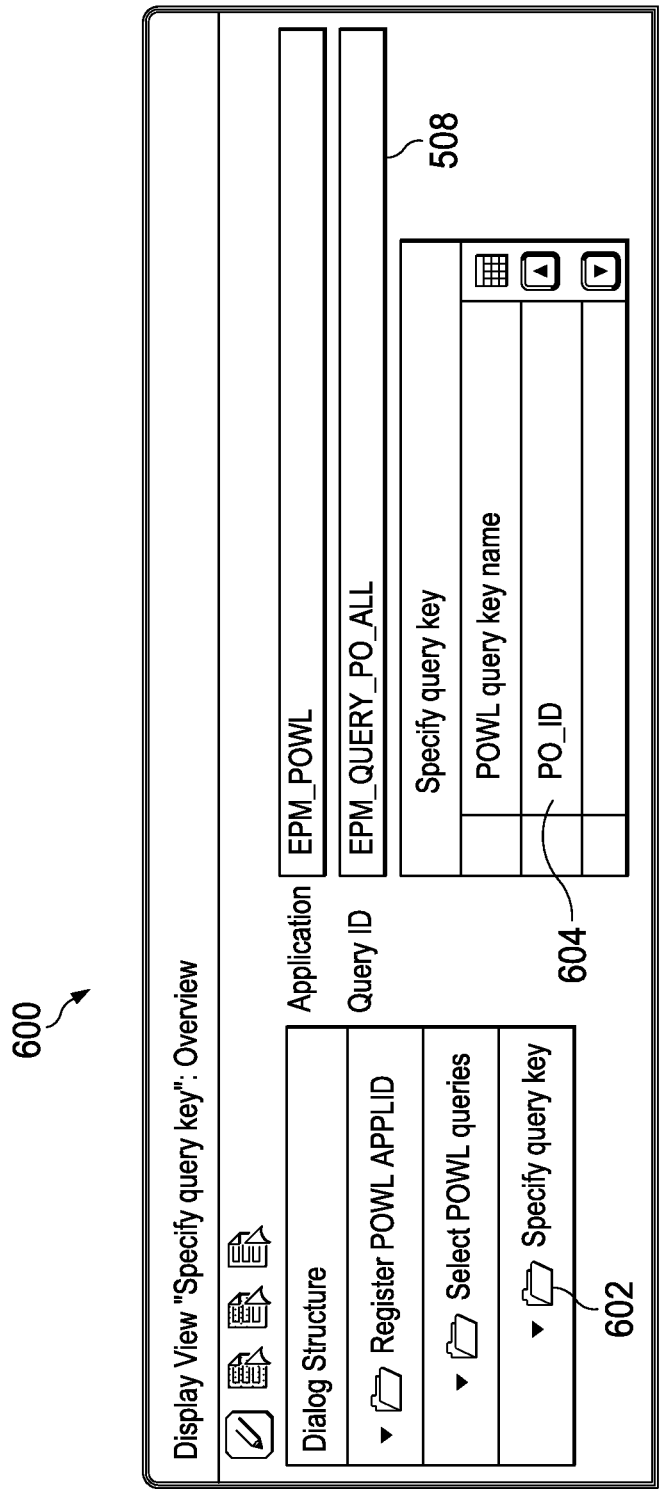
FIG. 6 illustrates a GUI for specifying a query key for a POWL query according to an implementation.

If a user selects a particular query, a query key can then be specified for the query (see FIG. 6).

FIG. 6 illustrates a GUI 600 for specifying a query key for a POWL query according to an implementation. For each POWL query, a query key must be specified (note 602) due to OData requirements. For example, for selected POWL query "EPM_QUERY_PO_ALL" 508, a query key must be selected (see "PO_ID" 604). As an example, "PO_ID" 604 could be a purchase order ID value and the internal field name for the particular POWL query "EPM_QUERY_PO_ALL" 508. A key must be selected for at least every active POWL query in FIG. 5.

Following actions in FIGS. 4-6, the OData service must be registered in the backend.

FIG. 7 illustrates a GUI 700 permitting registration of the OData service in the backend according to an implementation. Data 702 such as service name (here "/UI2/SAMPLE_EPM_POWL_CUST"), version, description, external service name, etc. are entered for the OData service.

Note that during the registration, the following are to be noted:

Specify a data provider class 704. This must be a suitable data provider class that performs translation between a POWL and data to the gateway data. For example, here the data provider class is named "/UI2/CL_POWL_APPLID_DATA."

Specify a custom technical model name 706 (it may have been entered previously—see 406 in FIG. 4). Here the technical model name is "/UI2/SAMPLE_APPLID_EPM_POWL_CU."

Specify a model provider class 708. This must be a suitable model provider class that allows applications to define their own OData models. For example, here the data provider class is named "/UI2/CL_POWL_MODEL_CUST."

After registration, the POWL application can be exposed as an OData service. Once the OData service is registered on the backend (and activated), the service name can be selected on the gateway server 150 and the POWL can be used as an OData service.

Support for System Query Options

The OData protocol supports system query options, for example:

$filter: Selects subset of entries specified in filter. Only ABAP select options are supported.

$orderby: Sorts columns in ascending or descending order.

$top: Identifies the first n number of entries. Used for paging.

$skip: Skips n number of entries. Used for paging.

In some implementations, the POWL—OData service does not support system query options. However, it some implementations the service can register for use with the above-mentioned UI2 Cache and have availability to at least the above-mentioned system query options. In some implementations, the UI2 Cache supports the system query options. Referring to FIG. 9, FIG. 9 illustrates a screenshot 900 of an example GUI providing customization to register the POWL-OData service for UI2 cache support for system query options (and/or other services) according to an implementation. For example, the POWL-OData service 902 registers using the UI2 Cache data provider class 904. System query options (filtering, sorting, paging, etc.) can be seen as available as selectable checkboxes (e.g., Sorting 906). In this way, the UI2 Cache can be used as a centralized location for "generic"-type functionality to make available without implementing it within multiple separate services.

Figure 8:
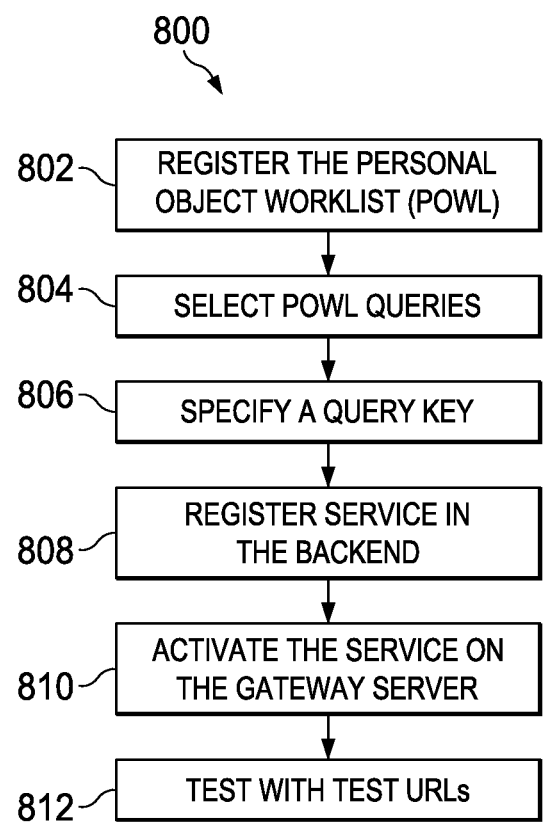
FIG. 8 illustrates an example method for exposing a POWL as an OData service according to an implementation.

FIG. 8 illustrates an example method 800 for exposing a POWL as an OData service according to an implementation and illustrates one possible sequence of steps required for a POWL query to be exposed as an OData service. For clarity of presentation, the description that follows generally describes method 800 in the context of FIGS. 1-7. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, and/or in any order.

At 802, a POWL APPLID is specified and mapped to the technical model name upon which an OData service is based. From 802, method 800 proceeds to 804.

At 804, POWL queries (associated with the POWL application) to consume are selected as well as marked as active or inactive. From 804, method 800 proceeds to 806.

At 806, for each POWL query, a query key is specified. From 806, method 800 proceeds to 808.

At 808, an OData service is registered in the backend. During registration, the following are to be noted:

Specify a data provider class. This must be a suitable data provider class that performs translation between a POWL and data to the gateway data.

Specify a custom technical model name.

Specify a model provider class. This must be a suitable model provider class that describes the Entity Data Model (EDM) of an OData service. It is the public API of a service describing the entities, their properties (i.e. fields), relations between entities and the operations that can be performed on them.

From 808, method 800 proceeds to 810.

At 810, the OData service is activated on the gateway server. From 810, method 800 proceeds to 812.

At 812, the activated OData service can be tested using test URLs. From 812, method 800 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:
1. A computer-implemented method comprising:
registering, by a computer, a personal object worklist (POWL) application, by specifying a POWL application ID (APPLID) and mapping the POWL APPLID to an Open Data Protocol (OData)-based service technical model to customize one or more POWL queries as an OData service without programming, the POWL application being configured to expose a respective POWL application content as a POWL, the one or more POWL queries being associated with the POWL application, the OData service being associated with the OData-based service technical model, the OData-based service technical model being generated from a POWL model that describes a structure and attributes of the POWL application based a POWL framework;

specifying, by the computer, a query key for each POWL query of the one or more POWL queries, the query key comprising an identifier of an operation associated with a respective POWL query of the one or more POWL queries, wherein the query key must be specified due to OData requirements for at least every active POWL query of the one or more POWL queries;

registering, by the computer, the OData service in a backend system; and activating, by the computer, the OData service on a gateway server system enabling the usage of the one or more POWL queries as the OData service.

2. The method of claim 1, wherein exposure of a specific POWL query though an OData service can be disabled.

3. The method of claim 1, wherein the query key is required for each active POWL query.

4. The method of claim 1, wherein registering the OData service in the backend system includes supplying information including service name, version, description, and external service name.

5. The method of claim 1, wherein registration of the OData service comprises:
specification of a data provider class performing translation between a POWL application and data used by a generic gateway;
specification of a custom technical model name; and
specification of a model provider class that describes an Entity Data Model (EDM) of the OData service and allows POWL applications to define custom OData models.

6. The method of claim 1, comprising exposing the POWL application as an OData service following registration and activation of the OData service.

7. The method of claim 1, comprising testing the exposed OData service using testing uniform resource locators (URLs).

8. A non-transitory, computer-readable medium storing computer-readable instructions executable by a computer and configured to:
register a personal object worklist (POWL) application, by specifying a POWL application ID (APPLID) and mapping the POWL APPLID to an Open Data Protocol (OData)-based service technical model to customize one or more POWL queries as an OData service without programming, the POWL application being configured to expose a respective POWL application content as a POWL, the one or more POWL queries being associated with the POWL application, the OData service being associated with the OData-based service technical model, the OData-based service technical model being generated from a POWL model that describes a structure and attributes of the POWL application based a POWL framework;
specify a query key for each POWL query of the one or more POWL queries, the query key comprising an identifier of an operation associated with a respective POWL query of the one or more POWL queries, wherein the query key must be specified due to OData requirements for at least every active POWL query of the one or more POWL queries;
register the OData service in a backend system; and
activate the OData service on a gateway server system enabling the usage of the one or more POWL queries as the OData service.

9. The medium of claim 8, wherein exposure of a specific POWL query though the OData service can be disabled.

10. The medium of claim 8, wherein the query key is required for each active POWL query.

11. The medium of claim 8, wherein registering the OData service in the backend system includes supplying information including service name, version, description, and external service name.

12. The medium of claim 8, wherein registration of the OData service comprises instructions to:
specify a data provider class performing translation between a POWL application and data used by a generic gateway;
specify a custom technical model name; and
specify a model provider class that describes an Entity Data Model (EDM) of the OData service and allows POWL applications to define custom OData models.

13. The medium of claim 8, comprising instructions to expose the POWL application as an OData service following registration and activation of the OData service.

14. The medium of claim 8, comprising instructions to test the exposed OData service using testing uniform resource locators (URLs).

15. A system, comprising:
a memory;
at least one hardware processor interoperably coupled with the memory and configured to:
register a personal object worklist (POWL) application, by specifying a POWL application ID (APPLID) and mapping the POWL APPLID to an Open Data Protocol (OData)-based service technical model to customize one or more POWL queries as an OData service without programming, the POWL application being configured to expose a respective POWL application content as a POWL, the one or more POWL queries being associated with the POWL application, the OData service being associated with the OData-based service technical model, the OData-based service technical model being generated from a POWL model that describes a structure and attributes of the POWL application based a POWL framework;
specify a query key for each POWL query of the one or more POWL queries, the query key comprising an identifier of an operation associated with a respective POWL query of the one or more POWL queries, wherein the query key must be specified due to OData requirements for at least every active POWL query of the one or more POWL queries;
register the OData service in a backend system; and
activate the OData service on a gateway server system enabling the usage of the one or more POWL queries as the OData service.

16. The system of claim 15, wherein exposure of a specific POWL query though the OData service can be disabled.

17. The system of claim 15, wherein the query key is required for each active POWL query.

18. The system of claim 15, wherein registering the OData service in the backend system includes supplying information including service name, version, description, and external service name.

19. The system of claim 15, wherein registration of the OData service is further configured to:
- specify a data provider class performing translation between a POWL application and data used by a generic gateway;
- specify a custom technical model name; and
- specify a model provider class that describes an Entity Data Model (EDM) of the OData service and allows POWL applications to define custom OData models.

20. The system of claim 15, further configured to expose the POWL application as an OData service following registration and activation of the OData service.

* * * * *